(No Model.)

A. HARRIS.
LOCOMOTIVE HEAD LIGHT.

No. 272,246. Patented Feb. 13, 1883.

Witnesses
W. T. Cole
M. McGill

Inventor:
Arthur Harris,
by Geo. W. T. Harris
Attys.

UNITED STATES PATENT OFFICE.

ARTHUR HARRIS, OF CHICAGO, ILL., ASSIGNOR TO J. McGREGOR ADAMS.

LOCOMOTIVE HEAD-LIGHT.

SPECIFICATION forming part of Letters Patent No. 272,246, dated February 13, 1883.

Application filed December 16, 1882. (No model.)

*To all whom it may concern:*

Be it known that I, ARTHUR HARRIS, a citizen of the United States of America, residing at Chicago, in the county of Cook and State of Illinois, have invented certain new and useful Improvements in Locomotive Head-Lights, of which the following is a specification, reference being had therein to the accompanying drawings.

This invention relates to improvements in means for displaying signals on locomotive head-lights; and, briefly considered, it consists in casting light directly or without the aid of reflectors laterally from the lamp into the space within the exterior case outside of the main reflector, and through transparent plates bearing a number or mark, and caution-signal glasses inserted in the respective sides of the case. To produce this result I cut off the apex or rear portion of the main reflector, and place in the rear of the opening so made, and in the rear of the lamp, a supplemental concave reflector, which serves practically as a continuation or extension of the main reflector. The numbered transparent plates and the caution-signal glasses are by their location in the sides of the outer case, and the projection of the burner beyond the open rear end of the main reflector, exposed to direct rays of light thrown laterally from the flame, and illuminated for signaling purposes. The supplemental reflector simply assists the function of the main reflector, and does not in any sense act as a reflector to throw light to the signal plates or glasses.

Figure 1:
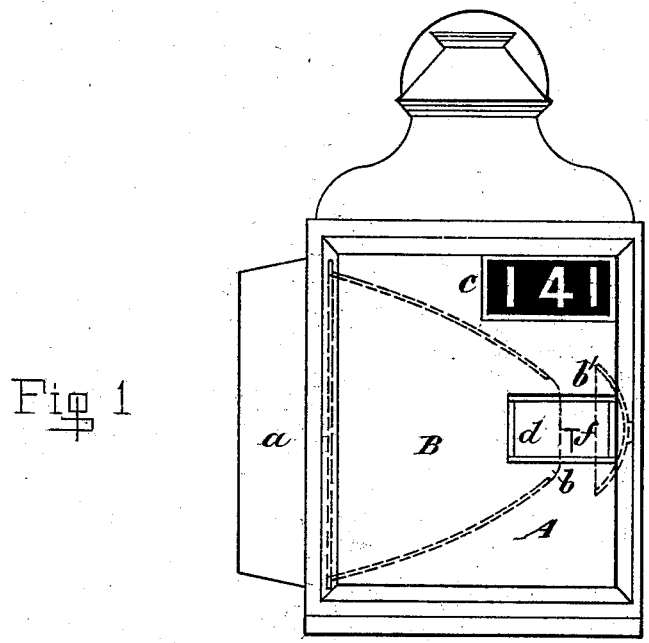
Figure 2:
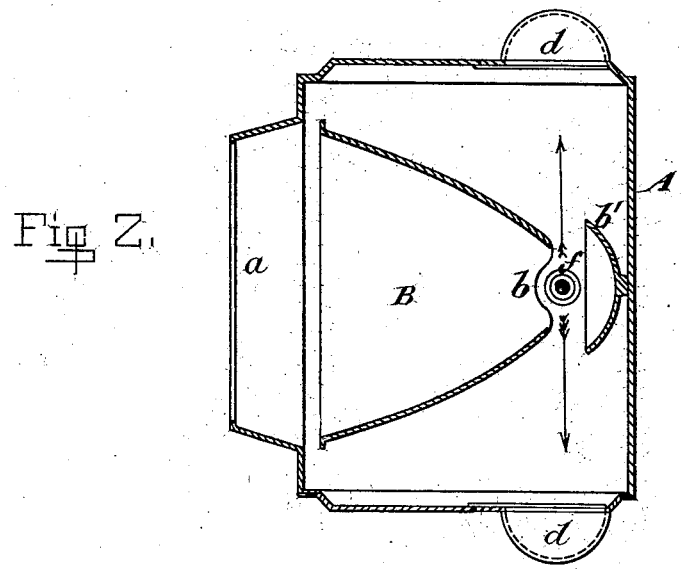

In the accompanying drawings, Figure 1 is a side view of my improved head-light. Fig. 2 is a sectional plan of the same.

Similar letters of reference indicate similar parts in both views.

A is the outer case of the head-light, and *a* its rim. B is the main reflector. The apex or rear portion of the main reflector B is preferably cut off on a line near the vertical center of the burner, as shown at *b*, though I do not restrict myself to the position of the line of the cut. In the rear of the opening so made, and behind the lamp, is placed the small supplemental concave reflector *b'*, which has a diameter larger than that of the hole cut in the main reflector. At the rear upper corner of each side of the case A, and opposite the vertical center line of the lamp, is placed a transparent plate, *c*, bearing a number or signal. Below each of said plates *c*, and in the horizontal plane of the axis of the main reflector, is a curved or hemispherical colored caution-signal glass, *d*, whose open side connects with an opening cut in the wall of the case. The caution-signal glasses may, however, be flat or of other construction differing from that shown in the drawings. The curved or concavo-convex glasses are preferred, as affording a better and more effective exhibition of the light. They may be either transparent or translucent. Light thrown laterally from the lamp-burner *f* will reach the transparent plates *c* and the colored caution-signal glasses *d* by direct transmission and illuminate the plates and glasses for signaling purposes. The supplemental reflector *b'* being of a diameter greater than that of the opening cut in the main reflector, the power of the latter as a reflector is not impaired, but is rather increased. The transparent plates and colored caution-signal glasses are made removable to admit of the interchange of numbers and colors.

This invention can be applied to head-lights now in ordinary use.

I claim as my invention—

1. In a locomotive head-light, a main reflector having its apex or rear portion removed, and a supplemental concave reflector placed in the rear of the lamp-burner, combined with transparent plates situated in the sides of the outer case, and a lamp located practically in the line of said plates, and adapted to cast direct rays of light thereon, substantially as set forth.

2. In a locomotive head-light, a main reflector having its apex or rear portion removed, and a supplemental concave reflector placed in the rear thereof, combined with a transparent plate fitted to bear a number or signal located in each side of the casing, and a colored caution-signal glass situated below each of said transparent plates, said plates and glasses being practically in line with the lamp, and adapted to receive rays of light directly from the lamp-flame, substantially as set forth.

3. In a locomotive head-light, a main reflector having its apex removed, and a supplemental concave reflector placed in the rear of the lamp-burner, combined with curved or concavo-convex transparent or translucent signal-glasses situated in the sides of the outer case practically in line with the lamp, and adapted to receive the direct rays of the lamp-flame, substantially as set forth.

In testimony whereof I affix my signature in presence of two witnesses.

ARTHUR HARRIS.

Witnesses:
L. A. GRAY,
P. C. ACKERMAN.